(12) United States Patent
Peshkin et al.

(10) Patent No.: US 7,126,983 B1
(45) Date of Patent: Oct. 24, 2006

(54) METHODS AND APPARATUS FOR COMMUNICATING COMMANDS AND DATA USING LOGICAL CHANNELS

(75) Inventors: Joel D. Peshkin, Irvine, CA (US); Paul Wren, Valronne (FR); Michael Whitfield, Valronne (FR)

(73) Assignee: Silicon Laboratories Inc., Austin, TX (US)

( * ) Notice: Subject to any disclaimer, the term of this patent is extended or adjusted under 35 U.S.C. 154(b) by 346 days.

(21) Appl. No.: 09/264,065

(22) Filed: Mar. 8, 1999

(51) Int. Cl.
*H04B 1/38* (2006.01)

(52) U.S. Cl. .................................................. 375/222
(58) Field of Classification Search ................ 375/222, 375/219, 220
See application file for complete search history.

(56) References Cited

U.S. PATENT DOCUMENTS

| | | | | |
|---|---|---|---|---|
| 4,656,318 A | * | 4/1987 | Noyes | ................... 379/102.04 |
| 4,750,171 A | * | 6/1988 | Kedar et al. | ................. 370/445 |
| 4,817,147 A | * | 3/1989 | Gorniak et al. | ............. 380/266 |
| 5,001,703 A | * | 3/1991 | Johnson et al. | ............. 370/280 |
| 5,249,218 A | * | 9/1993 | Sainton | ...................... 455/418 |
| 5,943,304 A | * | 8/1999 | Kamada et al. | ............. 711/111 |
| 5,943,505 A | * | 8/1999 | Lumpkin et al. | ............. 710/31 |
| 6,333,789 B1 | * | 12/2001 | Shima | ...................... 358/1.15 |

* cited by examiner

*Primary Examiner*—Kevin Burd
(74) *Attorney, Agent, or Firm*—O'Keefe, Egan & Peterman, LLP (57) ABSTRACT

A communication system for a computer includes apparatuses and methods for providing commands and data between a host computer and a multi-channel modem via a single host-to-modem physical channel using multiple logical channels. The communication system suitably includes a logical channel upon which each modem receives command data. Signals asserted on the logical channel corresponding to commands for a particular physical channel are automatically treated as commands. Signals on noncommand logical channels are processed as data to be transferred. Consequently, each physical channel of the modem may be controlled without requiring an escape sequence.

53 Claims, 6 Drawing Sheets

METHODS AND APPARATUS FOR COMMUNICATING COMMANDS AND DATA USING LOGICAL CHANNELS

BACKGROUND OF THE INVENTION

1. Field of the Invention

The present invention relates to communication systems, and more particularly, to communications for computers.

2. Description of the Related Art

As computers have become ubiquitous, the usefulness of the computers has increased by interconnecting them with other computers. To take advantage of the existing analog telephone network, modems were developed to facilitate transmission of data via conventional telephone connections. Initially, modems were strictly passive devices connected to a port on a host computer and could modulate data sent from the host computer and demodulate data received over the telephone lines. As modem technology advanced, microcontroller units (MCUs) were added to modems, and many of the configuration and control functions previously performed by other systems were assumed by the MCU, such as initiating a call, dialing a number, recognizing busy tones, and the like.

The addition of the MCU, however, did not eliminate the need for the host computer to direct the modem operations. Modems typically cannot determine which telephone number to call, whether to answer an incoming call, which data transfer speed may be desired, and many other parameters; the host computer directs these functions via commands sent to the modem.

Conventional modems provide only two physical links to the host computer, one for transmitting and the other for receiving. Consequently, all information is transmitted over the same link, regardless of the type of data. For example, data information, which comprises the actual data to be transmitted, is transmitted over the same link as message information, which provides information about the transmitted data information, such as channel information and data block size. Similarly, command information, which comprises commands to the modem, is also transmitted over the same link as the data information and the message information, and is commonly interspersed with such message information and data information.

To process commands, the modem switches to a command mode. One approach to signaling the modem to switch to command mode is to send an escape sequence. In this approach, the MCU checks every character sent from the host computer for the presence of the escape sequence. If detected, the modem enters command mode, processing all signals as commands until receipt of a carriage return, signifying the end of the command information. The modem then returns to data transmission mode and resumes checking every character until another escape sequence is detected. This approach, however, is susceptible to false detections of an escape sequence because a block of text may include the characters corresponding to the escape sequence.

Another approach to discriminating command information from message information and data information is disclosed in U.S. Pat. No. 4,549,302, issued to Dale A. Heatherington, on Oct. 22, 1985. The Heatherington patent discloses an escape sequence which utilizes a string of predetermined characters (in this case "+++") to signal the modem to enter command mode. The Heatherington approach also requires a one second pause before and after the "+++" escape sequence to create a generally acceptable method of detecting commands when used in conjunction with low data transmission rates. However, for high data rates, a two-second delay may result in significant delays.

Figure 1:
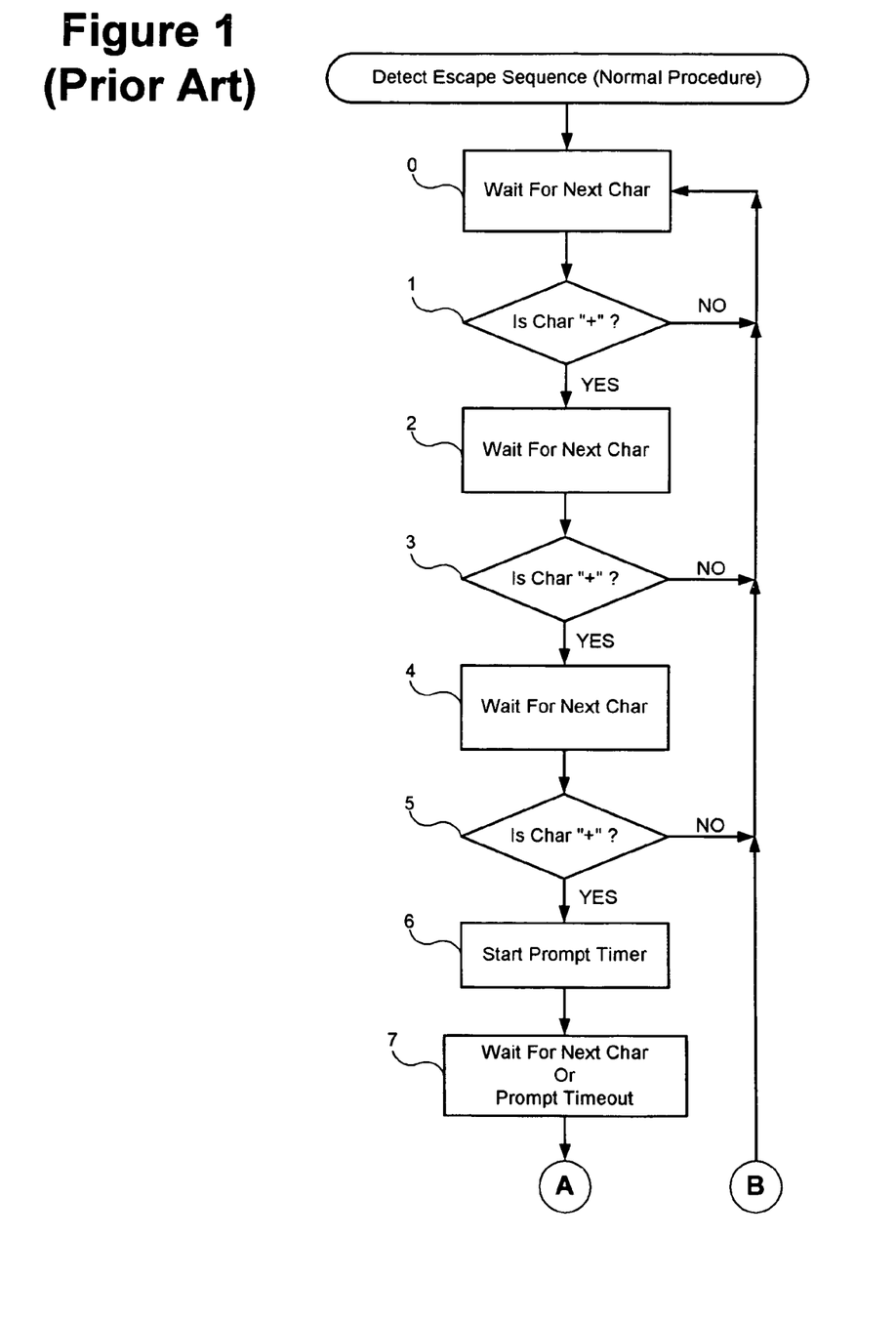
FIG. 1 is a flow diagram which shows the sequence of steps utilized in TIES.

Another approach used to determine when a modem should switch from transmission mode to command mode is the Timing Independent Escape Sequence (TIES) system. Under TIES, as shown in FIG. 1, the MCU analyzes the data stream as it passes through the modem until it detects the first character of an escape sequence (step 1). Upon detecting the first character, such as "+" for a "+++" escape sequence, the MCU waits (step 2) and checks the next character (step 3) to see if it is the second character of the escape sequence. If the second character is not a "+", the MCU waits for the next character (step 0) and resumes checking the data stream. If the second character is a the MCU waits (step 4) and checks the third character (step 5). If the third character is a "+", a portion of the escape sequence has been received, and the MCU starts a timer (step 6). The MCU then waits for either another character to be sent or for the timer to expire (step 7). If the timer expires first (step 8), an OK signal is sent (step 9) to acknowledge receipt of the escape sequence, and the MCU then waits for the next character (step 10). If another character is sent prior to time running out, the timer is disregarded, and the MCU checks whether the character is an "A" (step 11), the first character of any valid conventional "AT" command. If the character is not an "A", the following data is not a command and is processed as message data. If a valid escape sequence was sent, the next character sent by the host computer should be an "A" (step 11), followed by a "T" (step 13). Thus, the MCU, checks every character for the escape sequence. With the high data rates utilized in modern modems, TIES may overwork the MCU and significantly degrade modem performance.

Figure 2:
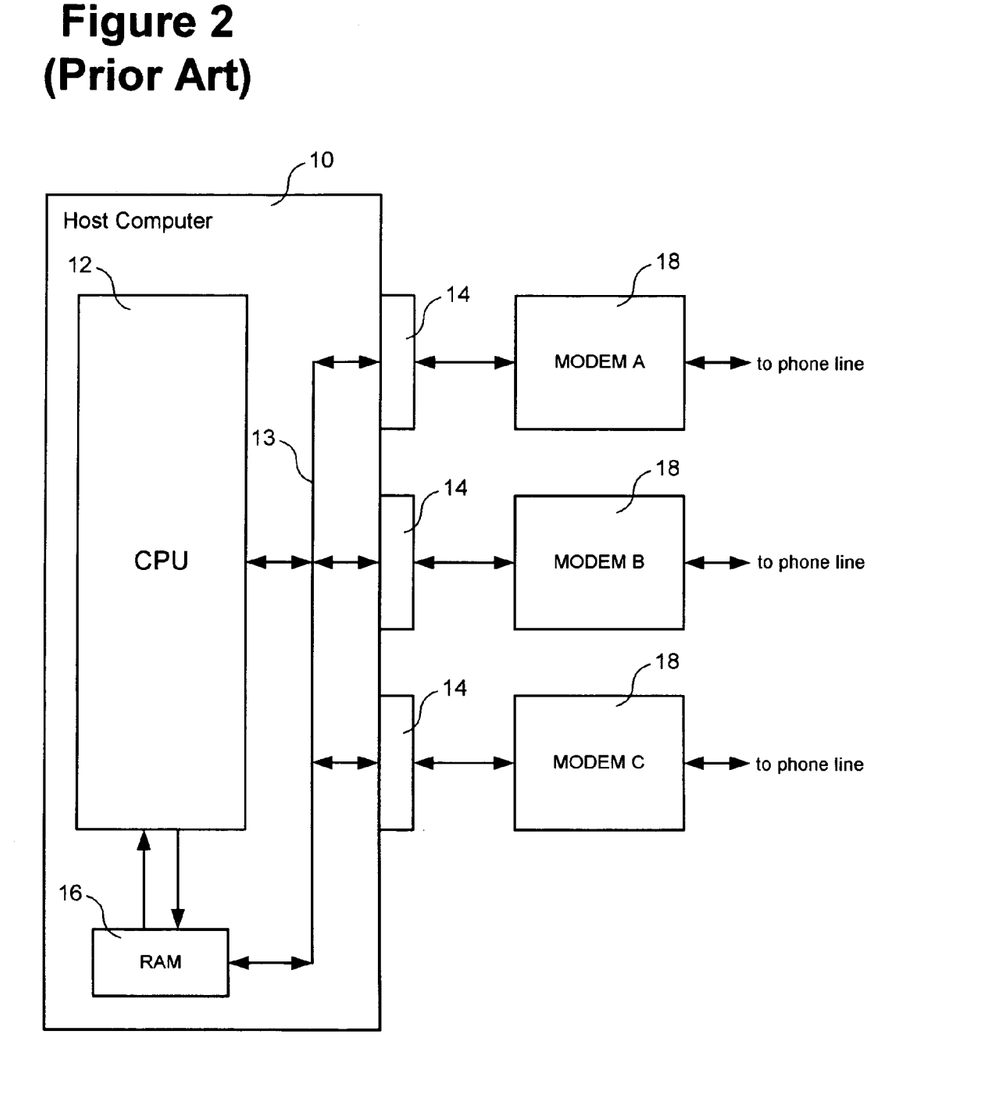
FIG. 2 is a block diagram which shows a host computer connected to three independent modems via a common bus and three interface ports.

Additionally, with the advent of the internet and internet service providers, multiple modems are now commonly connected to a single host computer system. These modems are often connected to the host computer via multiple single-channel modem circuit boards. Multiple modems present significant space, power, and interconnection issues. For example, connecting three modems to a host computer may involve redundant interfaces and modem components. FIG. 2 depicts one common arrangement, in which the host computer 10 contains a central processing unit (CPU) 12 and a data storage device, such as a RAM 16. The CPU 12 and the RAM 16 are connected to multiple modem interfaces 14 via a central data bus 13. The central data bus 13 transmits data between the modem interfaces 14 and the CPU 12 and the RAM 16.

As the modems 18 for each channel transfer data to and from the remote users, the CPU 12 typically controls data rates, the amount of data which can be sent or received, timing, and similar parameters to control the flow of data to multiple users via the central data bus 13. As a result, data awaiting processing by the CPU 12 or transfer to a modem 18 are often temporarily stored in RAM 16. When the data are to be transferred to a particular modem 18, the CPU 12 directs the data from the RAM 16 to be routed to the corresponding interface 14. The modem then operates in conventional fashion, modulating, demodulating, and receiving commands from the host computer.

As multiple modem connections to host computers increase, power, space and other concerns have made the current multiple interface, multiple modem approach cumbersome. To address these issues, multiple channel modems offer reduced redundancy and power consumption, among other advantages. Generally, multiple channel modems comprise single modems having multiple channels. As a result, the data flow rate between the modem and the host computer typically increases markedly. Instead of a single interface clocked to the maximum transmission speed of the modem, for example the 28.8 or 56.6 Kbytes per second rates commonly used today, a multiple channel modem may provide significantly higher data rates, especially if each channel is operating at its highest throughput rate. Insertion of a one-second pause for an escape sequence in this configuration is not only inefficient, it interrupts the communications for each channel.

SUMMARY OF THE INVENTION

In accordance with various aspects of the present invention, a communication system includes apparatuses and methods for providing commands and data between a host computer and a multi-channel modem via a single host-to-modem physical channel using multiple logical channels. The communication system suitably includes a logical channel upon which each modem receives command information. Signals asserted on the logical channel corresponding to commands for a particular physical channel are automatically treated as commands. Signals on noncommand logical channels are processed as data to be transferred. Consequently, each physical channel of the modem may be controlled without requiring an escape sequence.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF PREFERRED EXEMPLARY EMBODIMENTS

Figure 3:
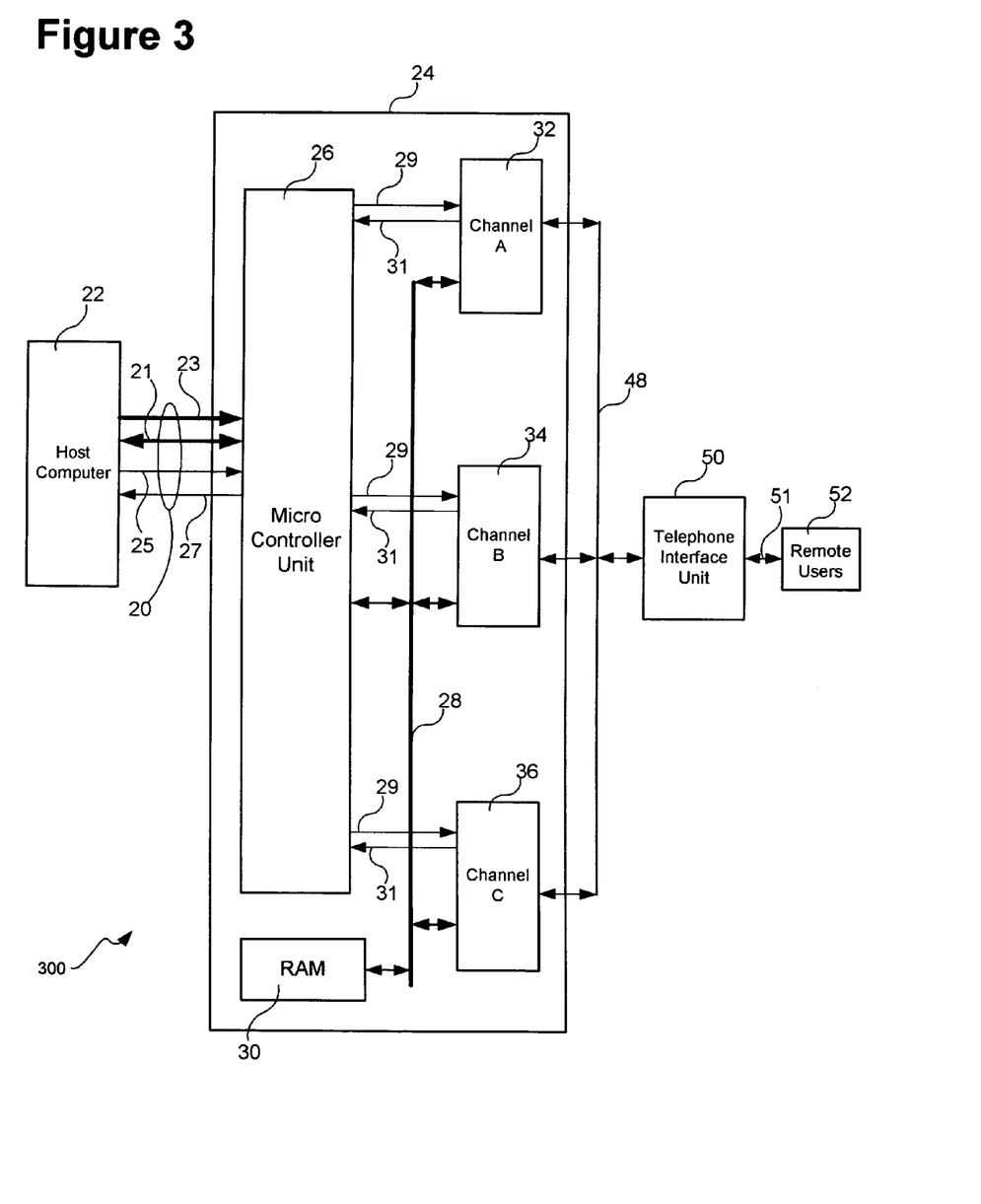
FIG. 3 is a block diagram which shows a multi-channel modem connected via a single interface to a host computer.

Referring now to FIG. 3, a communication system 300 for facilitating communication between a host computer 22 and at least one remote user computer 52 suitably comprises a modem 24 and a telephone interface unit 50. The host computer 22 comprises any data source or receiver for transmitting and/or receiving data, such as a server, mainframe, or other computer. Alternatively, the host computer 22 may comprise other sources or receivers, such as a camera, storage device, or television transmitter. In the present embodiment, the host computer 22 includes the internal processor of a remote access server, which operates as a portal through which the remote user computers 52 may gain access to, for example, the internet and other internet servers. The modem 24 is connected to the host computer 22 by an appropriate communications medium, such as a host bus 20, which may include a plurality of communication lines, including bi-directional data lines 21, address lines 23, control lines 25, and status lines 27. In the present embodiment, the host bus 20 includes sixteen bi-directional data lines, five address lines, seven control lines, and four status lines. Thus, the present system accommodates 16-bit (or 2-byte) data words, though the communications system 300 may be appropriately configured for data words of any size.

The host computer 22 suitably assembles data packets and sends them to the modem 24 via the bi-directional data lines 21. Conversely, data information may be transferred to the host computer 22 via the bi-directional data lines 21. In addition, address information is suitably transferred via the address lines 23 to facilitate proper routing of the data packets to the physical and logical channels. All data information transferred between the host computer 22 and the modem 24 is suitably transferred via the data lines 21, regardless of the number of physical and/or logical channels accommodated by the modem 24.

Remote user computer 52 may comprise any suitable data source or receiver for communicating with the host computer 22. In the present embodiment, the host computer 22 comprises a server, such as an internet server, and the remote user computer 52 comprises a personal computer equipped with appropriate communications hardware, such as a conventional modem.

The telephone interface unit 50 is connected to the modem 24 and a communications network, such as a telephone network. The telephone interface unit 50 transfers data between the remote user computer 52 and the modem 24. In the present embodiment, the telephone interface unit 50 comprises a T1/E1 transceiver/framer which connects multiple telecommunications devices to a T1 telecommunications line. A communications system according to various aspects of the present invention, however, is not limited to any particular telephone interface unit 50 or communications medium 51.

The modem 24 provides connectivity between the host computer 22 and the remote user computer 52, and may comprise any suitable mechanism for transmitting data between the host computer 22 and the telephone interface unit 50. In the present embodiment, the modem 24 suitably comprises a single interface multichannel modem (SIMCAM). The modem 24 receives power and stable timing signals from any suitable conventional system (not shown).

The modem 24 suitably operates in conjunction with multiple physical and logical channels. The physical channels correspond to physical links along which data may be transferred. Logical channels, on the other hand, comprise sets of data, suitably transferred on the same or different physical channels, that are to be transferred to the same destination. Thus, multiple logical channels may be transmitted on the same physical channel.

The modem 24 suitably includes an MCU 26; multiple physical channel interfaces 32, 34, 36; and a memory 30. The physical channel interfaces 32, 34, 36 transfer data between the MCU 26 and the telephone interface unit 50. The modem 24 of the present system operates in conjunction with three physical channel interfaces 32, 34, 36, though the modem 24 may be configured to include any appropriate number of physical channels. The MCU 26 interacts with the respective channel interfaces 32, 34, 36 via an appropriate bus system, such as a channel bus 28, control lines 29, and status lines 31. Each channel interface 32, 34, 36 is connected via an interface bus 48 to the telephone interface unit 50, which in turn may be connected via a communications medium 51 to the remote user computers 52. In the present embodiment, each physical channel interface 32, 34, 36 suitably transforms multi-bit parallel data received from the channel bus 28 into serial data to be transmitted to the telephone interface unit 50 via the interface bus 48, and vice versa. The physical channel interface functions may be performed by any suitable component, such as a digital data pump.

The memory 30 is also connected to the MCU 26 and the physical channel interfaces 32, 34, 36 via the channel bus 28. The memory 30 suitably stores data to be transferred to the MCU 26 or the physical channel interfaces 32, 34, 36. Accordingly, the memory 30 comprises any appropriate storage device, such as a RAM, a hard drive, an optical disk, or any other suitable storage device. In the present embodiment, the memory 30 comprises one megabyte of 16-bit synchronous dynamic RAM.

Figure 4:
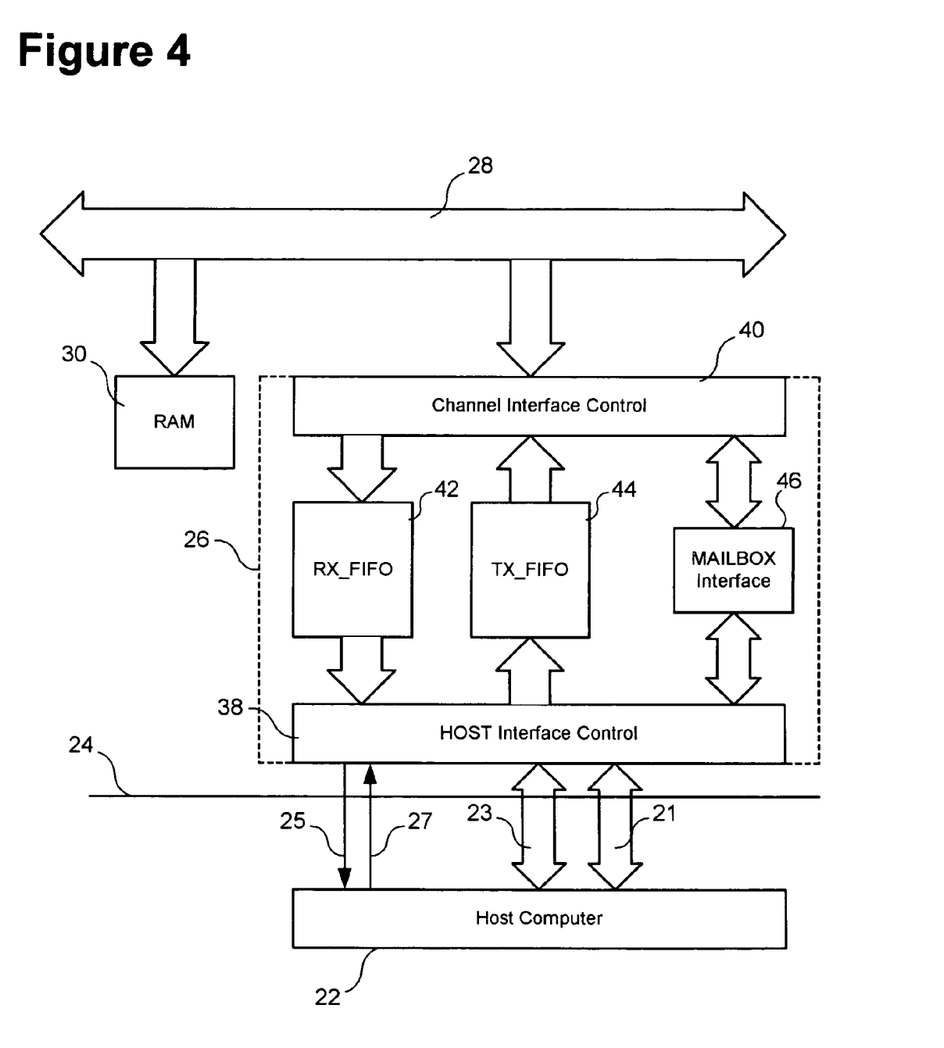
FIG. 4 is a block diagram which shows the interface between the host computer and the multiple-channel modem.

The MCU 26 controls the flow of data between the host computer 22, the memory 30, and the channel interfaces 32, 34, 36. Further, the MCU suitably performs various other control and management functions for the modem 24, such as buffering and controlling the flow of data between the host computer 22 and the physical channel interfaces 32, 34, 36. Referring now to FIGS. 3 and 4, the MCU 26 includes a host interface control unit 38; a transfer register comprising a receive first-in/first-out register (RX FIFO) 42 and a transmit first-in/first-out register (TX FIFO) 44; a mailbox interface 46; and a channel interface control unit 40. In the present system, each physical channel corresponds to at least one logical channel.

The host interface control unit 38 and the channel interface control unit 40 suitably facilitate the transfer of data to and from the transfer registers 42, 44 and the mailbox interface 46, for example by providing buffering functions. The transfer registers 42, 44 comprise memory locations in which data is stored to facilitate the transfer of data between the channel interface control unit and the host interface control unit. The transfer registers may comprise any sort of suitable memory, preferably comprising a high-speed memory such as a conventional RAM. The RX FIFO 42 transfers data packets from a remote user computer 52, while the TX FIFO 44 transfers data originating at the host computer 22. In the present embodiment, each transfer register 42, 44 stores up to 128 bytes of data. The 128 bytes within each transfer register 42, 44 may be variably allocated to any one or all of the modem physical and/or logical channels. Variable allocation facilitates connection of any number of physical and logical channels to the host computer 22 via a single interface.

The mailbox interface 46 comprises a memory, such as locations in a RAM, in which command information and message information are placed to facilitate communication between the host computer 22 and the MCU 26. In the present embodiment, the mailbox interface 46 comprises four transmit and four receive registers. Thus, the host processor 22 typically stores information in the four transmit registers and reads information from the receive registers. Conversely, the MCU stores information in the receive registers and reads information from the transmit registers. The mailbox interface 46 may further include separate status and interrupt control registers (not shown). The five address lines 23 connected to the mailbox interface 46 facilitate addressing up to 32 registers. Information may be stored in the mailbox interface 46 by the host computer 22 and the MCU 26 to transmit instructions and messages, for example data transfer, error, state report, and dialing control information. Message information stored in the mailbox interface 46 may relate to data stored in the transfer registers 42, 44 or may be independent of the transfer register 42, 44 contents.

In a communications system 300 according to various aspects of the present invention, information stored in the mailbox interface 46 comprises one mandatory 16-bit word and up to three additional optional words. The mandatory word suitably indicates the type of message or command and the relevant logical channel. In the present embodiment, the mandatory type information comprises an 8-bit field, which facilitates use of up to 256 different message types. The number of bits for identifying the information type, however, may be adjusted according to the number of types desired in a particular system. Similarly, the channel number information suitably comprises a second 8-bit field in the mandatory word, thus accommodating up to 256 logical channels. One of the channel numbers, such as channel number 255, may be reserved to indicate an operation that affects all channels. The remaining three words may provide further information associated with the type and channel number in the mandatory word.

For example, if the host processor 22 detects an error, the host processor 22 may place an error message in the mailbox interface 46. The error message suitably comprises a two-word message placed in the first two transmit registers in the mailbox interface 46. The first word comprises the type information (i.e., an error) and the channel information corresponding to the channel on which the error was detected. The second word suitably comprises information indicating the type of error detected, such as receipt of an unknown message. The MCU 26 may read the information from the mailbox interface 46 and take the appropriate action.

Other words may be used to control transfers of data between the host processor 22 and the physical channel interfaces 32, 34, 36. For example, a data block request message may be placed in the mailbox interface 46 to indicate that a data receiver, such as the host computer 22 or the physical channel interface 32, is ready to receive a block of data. The data block request message may include type information, channel number information, and a maximum number of bytes that the data transmitter should send. In addition, the data block request message may include a time-out period to enhance efficient use of the MCU resources. Similarly, a data transfer message may indicate that a block of data, such as asynchronous data, has been transferred to the appropriate transfer register 42, 44. The data transfer message suitably includes message type information, channel number information, and information indicating the size of the data block transferred to the transfer register 42, 44. The data transfer message may further include information indicating the status of the relevant data block, such as whether an error was detected and the type of the error.

Specifying the maximum amount of data which may be processed, such as in conjunction with the data block request message, facilitates variable allocation of memory space in the transfer registers 42, 44 to the logical channels. For example, the size of the data block indicated by the data block request message may be selected according to any suitable criteria, such as an amount that the relevant channel can process and the amount of space available in the relevant transfer register 42, 44.

For example, the modem 24 suitably implements a system of credit allocation which tends to control the size of data blocks to those that the channel can process without degrading system performance. In the present embodiment, the host computer 22 stores data packets in a local host memory (not shown). Data is thus suitably transferred between the memory of the host computer 22 and the RAM 30 of modem 24. The RAM 30 suitably operates as a buffer between the modem channels 32, 34, and 36 and the transfer registers 42, 44 by providing a temporary storage location for data. Each logical channel may be initially allocated a portion of the RAM 30 located within the modem 24 and controlled by the MCU 26.

The quantity of RAM 30 allocated to each channel is tracked by a software credit counter controlled by the MCU 26. The amount of RAM 30 dedicated to the respective channels may be swapped between the channels according to any suitable criteria, such as according to data loads, data rates, and the like. When a data block request message is received, the MCU grants a number of credits, such as those already allocated to the relevant channel, by adjusting the counter associated with the relevant logical channel accordingly. If the requested data block is larger than the corresponding number of credits, the MCU suitably suspends data transfer on that logical channel until credits for that channel are granted. The sender suitably sends data until the credit is exhausted. If further data is available to be transferred, another data request may be made, and additional credits issued as credits become available.

Routing information is typically provided with data to facilitate routing and channel identification between the host computer 22 and the physical channel interfaces 32, 34, 36. For example, routing information may be provided separately from the data, for example via the address lines 23. For data to be transmitted by the host processor 22 to a particular physical channel interface 32, the address information, including the channel number information corresponding to physical channel interface 32, is provided via the address lines 23 to the transmit registers of the mailbox interface 46. The channel number information is then suitably read from the mailbox interface by the MCU 26, which then transfers the data in the transmit FIFO 44 to the appropriate physical channel interface 32. Conversely, when data from one of the physical channel interfaces 34 is stored in the receive FIFO 42, the MCU 26 suitably stores channel number information in the receive registers of the mailbox interface 46. The channel number information may be read by the host processor 22 to identify the physical channel interface 34 associated with the data in the receive FIFO 42.

Alternatively, routing information may be inserted into the data itself. For example, routing information may be included in a header that is placed at the beginning of the data packet to be stored in one of the transfer registers 42, 44. The header information suitably indicates the presence of the data packet, its length, and the channel number associated with the data. Message information may be similarly transmitted by converting the message information into a data packet and identifying it as such.

A communications system 300 according to various aspects of the present invention facilitates separation of commands from transferred data and associated message information. In the present embodiment, each physical channel corresponds to two logical channels. For example, the first three logical channels, suitably logical channels 0, 1, and 2, are assigned as logical channels for data to be transferred and associated message information to be transferred on the three physical channels, respectively. Three other logical channels, suitably logical channels 128, 129, and 130, are assigned as logical channels for commands for each of the physical channels, respectively. Thus, each physical channel corresponds to a main logical channel for data and associated message information, and a command logical channel for commands. For example, to provide a command to a particular channel of the modem 24, the host computer 22 provides the command information to the logical channel corresponding to the relevant physical channel. Command information may be stored in the transmit FIFO 44 or in the mailbox interface 46. The channel number information designating the logical channel for command information for the relevant physical channel is suitably stored in the mailbox interface 46. The MCU 26 automatically processes any information received via command logical channels as command information. Consequently, the MCU 26 may detect command information without analyzing each character in the data stream, like the TIES system, or wait two seconds before and after the transmission of an escape sequence, like the Heatherington approach. Thus, multi-channel command information, message information, and data may be transferred over a single physical interface and allows the MCU 26 to perform other tasks instead of repeatedly checking each data character for the presence of an escape sequence.

In some configurations, the host computer 22 is a central computer, such as a server or mainframe, to which multiple terminals are connected. For example, referring to FIG. 5, the host computer 22 may be connected to an intranet interface unit 56 which may be connected to a plurality of terminals 58 by appropriate network cables 59. The terminals 58 are suitably configured in conjunction with the intranet interface unit 56 and the host computer 22 such that the existence of the host computer 22 is transparent and it appears to the operator of a terminal 58 that the terminal 58 is a stand-alone unit.

Figure 5:
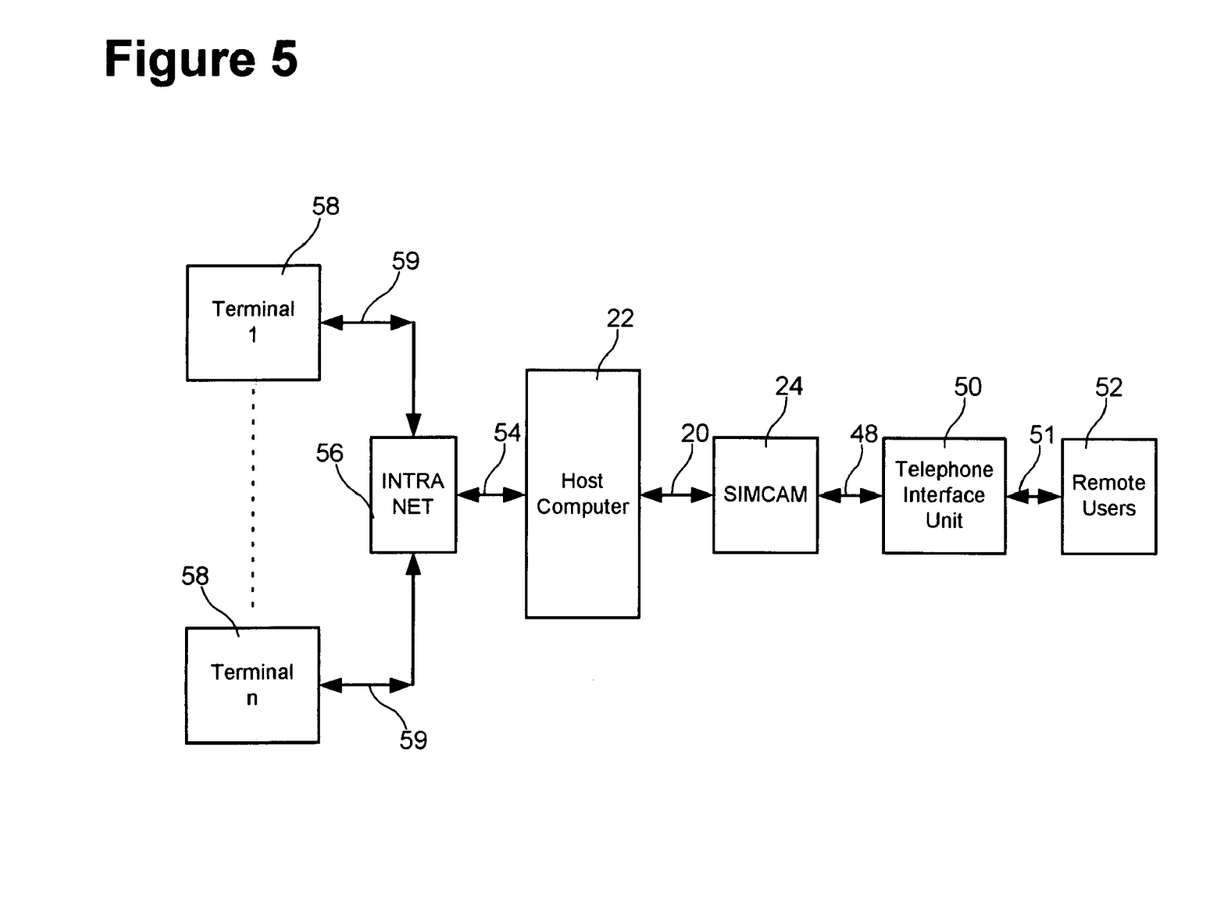
FIG. 5 is a block diagram depicting a plurality of terminals connected to a host computer.

To initiate a modem connection, the host computer 22 establishes a link with one of the modem channels of the modem 24, for example by sending command information to the transmit FIFO 44 and the channel number information corresponding to the relevant command logical channel to the mailbox interface 46. In conventional networks, the terminal 58 connected to the modem via the host computer 22 operates as if it were connected directly to the modem 24. Accordingly, the terminal 58 may attempt to send a command directly to the modem 24 instead of requesting the host computer 22 to send the command. A command initiated by the terminal 58, however, may be provided in a conventional manner, for example by asserting an escape sequence in the data provided to the modem 24, instead of sending a command on the appropriate command logical channel. Consequently, a communication system 300 according to various aspects of the present invention monitors the contents of the RAM 30 allocated to each logical channel for conventional escape sequence detection schemes. For example, the modem 24 may operate in conjunction with an improved escape detection scheme as disclosed in U.S. patent application Ser. No. 09/264,777, entitled "Method for Reducing CPU Burden in Monitoring Data Traffic for Escape Sequences", filed Mar. 9, 1999.

If the MCU 26 detects a command from a terminal 58 in the RAM 30, the command is suitably provided to the host computer 22. The host computer 22 may issue the appropriate command via the command logical channel to the modem 24. The modem 24 suitably executes the command and responds to the host computer 22. The host computer 22 then forwards the response to the terminal 58.

Thus, a communication system according to various aspects of the present invention may separate commands from other data transmitted between a host computer unit and a multi-channel modem. Transmission of commands via a separate logical channel facilitates transfer and execution of commands without requiring a particular escape sequence. Consequently, analyzing each character for an escape sequence or waiting for a delay is not required. Further, the communication system may be adapted to operate in conjunction with conventional equipment and software. The communication system may also vary the allocation of transfer register and memory resources according to relevant criteria, such as data loads for the various channels.

Although the present invention has been described in conjunction with the appended drawing figures, it will be appreciated that the invention is not so limited. Various additions, deletions, substitutions, and rearrangement of parts or method steps may be made without departing from the spirit and scope of the present invention, as set forth more particularly in the appended claims.

The invention claimed is:

1. A modem comprising at least one physical channel for transmitting data from a source to a receiver, said physical channel having a first logical channel and a second logical channel, wherein:

said first logical channel is configured to transmit only command information from the source to the modem for controlling telephone line operations of the modem, said first logical channel being defined by a command type in said command information, wherein said command information for controlling telephone line operations of the modem includes a command to call a telephone number or a command to answer an incoming call; and said second logical channel is configured to transmit data information from the source to the receiver through the modem, said second logical channel being defined by a data type in said data information.

2. The modem of claim 1 further comprising an MCU coupled to said physical channel.

3. The modem of claim 2 wherein said MCU comprises a mailbox memory for storing said command information.

4. The modem of claim 2 wherein said MCU further comprising transfer registers for storing said data.

5. The modem of claim 2 further comprising a physical channel interface for transforming serial data from said source to parallel data at said MCU and parallel data from said MCU to serial data transmitted to said receiver.

6. A communication method for use by a modem, said method comprising the steps of:

receiving data information via a first logical channel, said first logical channel being defined by a data type in said data information;

receiving command information via a second logical channel, said second logical channel being defined by a command type in said command information, wherein said first and second logical channels are a part of a single physical channel;

transferring said data information received via said first logical channel to a receiver;

reading said command information received via said second logical channel; and executing said command information for controlling telephone line operations of said modem, wherein said command information for controlling telephone line operations of said modem includes a command to call a telephone number or a command to answer an incoming call.

7. The method of claim 6 further comprising the step of transmitting a data block request message.

8. The method of claim 7 wherein said step of transmitting a data block request message comprises transmitting information indicating a maximum number of bytes of data that should be transmitted.

9. The method of claim 7 further comprising the step of variably allocating memory allocated to said first logical channel.

10. The method of claim 9 further comprising the step of implementing a system of credit allocation to control the maximum number of bytes of data transmitted.

11. The method of claim 10 wherein said step of implementing is carried out to optimize performance of said modem.

12. The method of claim 7 further comprising the steps of providing a memory space in said modem and allocating a portion of said memory space to each of said logical channels.

13. The method of claim 12 further comprising the step of tracking the memory allocated to each of said logical channels with a software credit counter.

14. The method of claim 13 further comprising the step of swapping memory allocated to each of said logical channels responsive to said data block request message.

15. The method of claim 13 further comprising the step of suspending data transfer if the memory allocated to a logical channel is insufficient to accommodate a requested data block.

16. The method of claim 6 further comprising transmitting a data transfer message.

17. The method of claim 16 wherein said step of transmitting a data transfer message further comprising transmitting information indicating the size of the data block transferred.

18. The method of claim 6 further comprising the steps of:

monitoring said data information for embedded command information; and executing said embedded command information for controlling telephone line operations of said modem.

19. A modem device capable of communicating information with a host via a host interface, said information including command information and data information, said device comprising:

a controller in communication with said host interface for receiving said information from said host;

a physical channel interface including a data pump; and a physical channel in communication with said controller and said physical channel interface, said physical channel including a logical command channel and a logical data channel;

wherein said controller provides said command information to said physical channel interface via said logical command channel and provides said data information to said physical channel interface via said logical data channel, and wherein said command information includes a command type defining said logical command channel, and said data information includes a data type defining said logical data channel, and wherein said command information controls telephone line operations of said modem and includes a command to call a telephone number or a command to answer an incoming call.

20. The device of claim 19, wherein said controller comprises:

a transmit buffer capable of buffering said information prior to providing said information to said physical channel interface; and a mailbox for use in conjunction with said transmit buffer to distinguish between said command information and said data information in said transmit buffer;

wherein said transmit buffer and said mailbox are in communication with said host interface.

21. The device of claim 20, wherein said controller further comprises:

a receive buffer capable of receiving and buffering data from said physical channel interface via said physical channel.

22. The device of claim 20, wherein said mailbox comprises:

a receive register; and a transmit register;

wherein said controller writes first data to said receive register and reads second data from transmit register, and wherein said host writes said second data to said transmit register and reads said first data from receive register.

23. The device of claim 22, wherein said first and second data indicate an information type.

24. The device of claim 23, wherein said information type includes a message information type, a command information type and a data information type.

25. The device of claim 22, wherein said first and second data indicate a logical channel type.

26. The device of claim 25, wherein said logical channel type includes a logical command channel type and logical data channel type.

27. The device of claim 19, wherein said host interface includes a plurality of bi-directional data line, a plurality of address lines, a plurality of control lines and a plurality of status lines.

28. The device of claim 19, wherein said controller comprises:

a transmit buffer capable of buffering said information prior to providing said information to said physical channel interface; and a credit counter for use to control information flow from said host.

29. The device of claim 28, wherein said credit counter indicates a number of bytes that can be received from said host.

30. The device of claim 19, wherein said physical channel further includes a logical message channel and said information further includes a message information, said controller provides said message information to said physical channel interface via said logical message channel, and wherein said message information includes a message type defining said logical message channel.

31. A modem device capable of communicating information with a host via a host interface, said information including command information and data information, said device comprising:

a controller in communication with said host interface for receiving said information from said host:

a plurality of physical channel interfaces, each of said plurality of physical channel interfaces including a data pump; and a plurality of physical channels, wherein said controller is in communication with each of said physical channel interfaces via at least one of said plurality of physical channels, and wherein at least one of said plurality of physical channels includes a logical command channel and a logical data channel;

wherein said controller provides said command information to said at least one of said plurality of physical channel interfaces via said logical command channel and provides said data information to said at least one of said plurality of physical channel interfaces via said logical data channel, and wherein said command information includes a command type defining said logical command channel, and said data information includes a data type defining said logical data channel, and wherein said command information controls telephone line operations of said modem and includes a command to call a telephone number or a command to answer an incoming call.

32. The device of claim 31, wherein said controller comprises:

a transmit buffer capable of buffering said information prior to providing said information to one of said plurality of physical channel interfaces; and a mailbox for use in conjunction with said transmit buffer to distinguish between said command information and said data information in said transmit buffer designate for each of said plurality of physical channel interfaces;

wherein said transmit buffer and said mailbox are in communication with said host interface.

33. The device of claim 32, wherein said controller further comprises:

a receive buffer capable of receiving and buffering data from said plurality of physical channel interfaces via said plurality of physical channels.

34. The device of claim 32, wherein said mailbox comprises:

a receive register; and a transmit register;

wherein said controller writes first data to said receive register and reads second data from transmit register, and therein said host writes said second data to said transmit register and reads said first data from receive register.

35. The device of claim 34, wherein said first and second data indicate an information type.

36. The device of claim 35, wherein said information type includes a message information type, a command information type and a data information type.

37. The device of claim 34, wherein said first and second data indicate a physical channel number and a logical channel type.

38. The device of claim 37, wherein said physical channel number indicates one of said plurality of physical channels and said logical channel type includes a logical command channel type and logical data channel type.

39. The device of claim 31, wherein said host interface includes a plurality of bi-directional data line, a plurality of address lines, a plurality of control lines and a plurality of status lines.

40. The device of claim 31, wherein said controller comprises:

a transmit buffer capable of buffering said information prior to providing said information to said plurality of physical channel interfaces; and a credit counter for use to control information flow from said host.

41. The device of claim 40, wherein said credit counter indicates a number of bytes that can be received from said host.

42. A method of communicating information between a modem device and a host via a host interface, said device including a controller in communication with said host interface and a physical channel, wherein said physical channel is in communication with a physical channel interface having a data pump, and said information including command information and data information, said method comprising:
- defining a logical command channel in said physical channel based on a command type;
- defining a logical data channel in said physical channel based on a data type;
- providing said command information, including said command type, to said physical channel interface via said logical command channel, wherein said command information controls operations of said data pump and includes a command to call a telephone number or a command to answer an incoming call; and
- providing said data information, including said data type, to said physical channel interface via said logical data channel.

43. The method of claim 42 further comprising:
- buffering said information in transmit buffer prior to providing said information to said physical channel interface: and
- distinguishing between said command information and said data information in said transmit buffer.

44. The method of claim 43 further comprising:
- receiving data from said physical channel interface via said physical channel; and
- buffering said data in a receive buffer.

45. The method of claim 43, wherein said distinguishing is performed using a mailbox, said mailbox comprises:
- a receive register; and
- a transmit register;
- wherein said controller writes first data to said receive register and reads second data from transmit register, and wherein said host writes said second data to said transmit register and reads said first data from receive register.

46. The method of claim 45, wherein said first and second data indicate an information type.

47. The method of claim 46, wherein said information type includes a message information type, a command information type and a data information type.

48. The method of claim 47, wherein said first and second data indicate a logical channel type.

49. The method of claim 48, wherein said logical channel type includes a logical command channel type and logical data channel type.

50. The method of claim 42, wherein said host interface includes a plurality of bi-directional data line, a plurality of address lines, a plurality of control lines and a plurality of status lines.

51. The method of claim 42 further comprising:
- buffering said information in a transmit buffer prior to providing said information to said physical channel interface: and
- updating a credit counter for controlling information flow from said host.

52. The method of claim 51, wherein said credit counter indicates a number of bytes that can be received from said host.

53. A modem device capable of communicating information with a host via a host interface, said information including command information, message information and data information, said device comprising:
- a controller in communication with said host interface for receiving said information from said host, said controller including a transfer register having:
  - a receive first-in/first-out (FIFO) register for storing said data information:
  - a transmit FIFO register for storing said data information;
  - a mailbox for storing said command information and said message information, wherein each of said command information and said message information includes a type and a channel number, and wherein said command information controls operations of said data pump and includes a command to call a telephone number or a command to answer an incoming call;
- a physical channel interface including a data pump; and
- a physical channel in communication with said controller and said physical channel interface, said physical channel including a logical command channel and a logical data channel;
- wherein said controller provides said command information and said message information from said mailbox to said physical channel interface via said logical command channel based on said type and said channel number and communicates said data information in said receive FIFO and said transmit FIFO with said physical channel interface via said logical data channel.

* * * * *

UNITED STATES PATENT AND TRADEMARK OFFICE
CERTIFICATE OF CORRECTION

PATENT NO. : 7,126,983 B1 Page 1 of 1
APPLICATION NO. : 09/264065
DATED : October 24, 2006
INVENTOR(S) : Peshkin et al.

It is certified that error appears in the above-identified patent and that said Letters Patent is hereby corrected as shown below:

In claim 34, column 12, line 38, delete "therein" and insert --wherein--.

Signed and Sealed this

Ninth Day of January, 2007

JON W. DUDAS
*Director of the United States Patent and Trademark Office*